United States Patent [19]
Kari et al.

[11] Patent Number: 5,934,618
[45] Date of Patent: Aug. 10, 1999

[54] PASSIVE DYNAMIC STRUCTURE DAMAGE CONTROL IN A HYDRAULIC RAM ENVIRONMENT

[75] Inventors: Stuart E. Kari, Kent; Gerould K. Young, Seattle, both of Wash.

[73] Assignee: The Boeing Company, Seattle, Wash.

[21] Appl. No.: 08/566,344

[22] Filed: Dec. 1, 1995

[51] Int. Cl.$^6$ .................................................. B64D 37/32
[52] U.S. Cl. ..................... 244/135 R; 220/562; 220/88.1
[58] Field of Search ............................ 244/135 R, 135 B, 244/123; 220/562, 563, 564, 88.1

[56] References Cited

U.S. PATENT DOCUMENTS

| | | | |
|---|---|---|---|
| 2,429,688 | 10/1947 | Hoover | 244/135 R |
| 3,420,477 | 1/1969 | Howard | 244/135 R |
| 3,506,224 | 4/1970 | Harr et al. | 244/135 R |
| 3,787,279 | 1/1974 | Winchester . | |
| 4,172,573 | 10/1979 | Moore et al. . | |
| 4,412,687 | 11/1983 | Andre . | |
| 4,557,444 | 12/1985 | Jackson et al. . | |
| 4,774,118 | 9/1988 | Davis et al. . | |
| 4,886,225 | 12/1989 | Bates . | |
| 4,925,057 | 5/1990 | Childress et al. . | |

FOREIGN PATENT DOCUMENTS 8701332  3/1987  WIPO .................................. 244/123

OTHER PUBLICATIONS

Y. S. Shin, C. Y. Wang, J. D. Colton, R. F. Kulak Shock and Wave Propagation, Fluid–Structure Interaction, and Structural Responses, vol. 159, Honolulu, Hawaii, USA, pp. 45–50.

Primary Examiner—Andres Kashnikow
Assistant Examiner—Tien Dinh
Attorney, Agent, or Firm—Thomas W. Hennen

[57] ABSTRACT

An aircraft fuel tank construction for providing enhanced fuel tank survivability and aircraft structural integrity when the fuel tank is penetrated by an exploding projectile, utilizes selective placement of low density, fluid-displacing material to create a low shock impedance region which decouples protected fuel tank structure from the destructive effects of a shock wave. The low shock impedance region may be formed using closed cell foam, or using isolators comprising bladders inflated with a compressible, inert gas. Such bladders should have a wedge shape and a wedge angle of at least 15 degrees. Precise shape is less important with closed cell foam. Polymethylacrilimide has been shown to be particularly effective for this purpose. Finite element analysis is useful in tuning the design of actual low shock impedance regions for actual aircraft designs. This construction is especially useful in fuel tanks manufactured from composite materials where tank wall pull-off from internal spars and stiffeners is the primary mode of catastrophic structural failure.

12 Claims, 6 Drawing Sheets

PASSIVE DYNAMIC STRUCTURE DAMAGE CONTROL IN A HYDRAULIC RAM ENVIRONMENT

BACKGROUND OF THE INVENTION

1. Field of the Invention

The present invention pertains to a method and apparatus for enhancing survivability of a liquid containing structure subjected to penetration by high velocity exploding projectiles. With greater particularity, the present invention pertains to a fuel tank construction for use in a military aircraft. With greatest particularity, the present invention pertains to a military aircraft fuel tank construction using composite materials that also utilizes selective placement of low density, fluid-displacing material. This low density, fluid-displacing material creates a low shock impedance region which decouples protected fuel tank structure from the destructive effects of combined far and near field loading caused by a shock wave and hydrodynamic ram effect accompanying tank penetration and detonation of a high velocity projectile.

2. Description of the Related Art

Aircraft powered by conventional propulsion means typically utilize liquid hydrocarbon fuels such as kerosene or other blended aviation products. Aircraft usually carry their fuel supply in tanks integrated within the aircraft structure, either in the wing or fuselage. Modern aircraft construction has moved beyond all aluminum structure towards structures utilizing greater amounts of composite materials. Such materials provide greater strength-to-weight ratios than metal, and they benefit military aircraft by offering a lower radar return signature. Composite structures, when loaded to the point of failure, tend to be more brittle and to fail more abruptly and less gracefully than all aluminum structures. Military aircraft manufactured using composite materials, typically a carbon fiber or other fiber matrix impregnated with synthetic resin, present demanding survivability challenges to aircraft designers.

Military aircraft fuel tanks utilizing composite materials can be particularly vulnerable to projectiles that penetrate the liquid fuel containment volume and produce a shock wave from their high velocity (hydraulic ram effect), but more importantly produce a shock wave when an explosive charge contained within the projectile, detonates. High-speed projectiles may originate from enemy military aircraft cannon fire or from ground fire. Such projectiles can enter aircraft structure at supersonic velocity. When high-speed exploding projectiles encounter a fluid that is more dense than air, such as jet engine fuel, they can produce a shock wave that can have destructive effects upon adjacent aircraft fuel tank structure. These destructive effects can be catastrophic in an aircraft using composite materials if the fuel tank wall is caused to separate from internal spars and other stiffeners.

Many prior attempts to enhance survivability of aircraft fuel tankage are represented by U.S. Pat. No. 3,787,279 to Winchester for Shock and Fire Attenuating Fuel Tank. This United States patent, assigned to the United States Navy, uses a continuous layer of fiber reinforced foam material as a liner inside a metallic tank to reduce damage caused by hydraulic ram pressure effects. This design provides a continuous layer of foam material covering the inner surface of the fuel tank wall.

Another approach, represented by U.S. Pat. No. 4,172,573 to Moore, et al., for Fuel Tank, provides a crash-worthy fuel tank which has built-in unfilled space or energy-absorbing material which can attenuate some internal pressure resulting from external forces acting on the tank, so that the internal fuel pressure does not cause fuel tank rupture. This approach utilizes internal bulkheads which separate an unfilled space or energy absorbing material from the contained fluid or fuel volume. In this manner, internal fuel pressure resulting from external compression of the tank walls, acts on the unfilled or energy-absorbing material volumes contained within the tank rather than acting directly on the external tank walls that may lead to tank wall rupture. This design provides a margin of safety which enhances fuel tank survivability.

Yet another more specialized approach, shown in U.S. Pat. No. 4,886,225 to Bates for Inflatable Fuel Tank Buffer, provides an inflatable bladder on the interior surface of an integral fuel tank, between the wall of an aircraft inlet duct and the liquid fuel, to reduce the potential damage caused by hydraulic ram effect from high speed projectile penetration of the tank wall to thereby reduce the size of the projectile exit hole and reduce the volume of leaking fuel that may flow into the engine inlet and choke the engine.

Another approach uses resilient bladders filled with an inert gas to continuously line the walls of the fuel tank to protect fuel in the tank from explosion or leakage in the event that the tank is punctured by a ballistic projectile. This approach is described in U.S. Pat. No. 4,925,057 to Childress, et al., for Fuel Tank Having Ballistic Protection Bladder. In this embodiment, a plurality of bladders line the entire internal surface of the fuel tank.

All of these approaches to the problem of enhanced fuel tank survivability, provide continuous protection to the fuel tank walls because of random uncertainty as to the exact location and direction of a penetrating projectile, and assumed equal vulnerability at all locations. This approach gives up fuel tank volume in return for enhanced fuel tank survivability. Such construction is often recommended in metallic fuel tanks where the tank is equally vulnerable to penetrating projectiles over its entire surface, but such techniques may be wasteful in composite fuel tanks, especially for fighter type aircraft where fuel capacity is at a minimum anyway, and where some portions of the tank may be more or less robust than others.

The conventional approach to mitigating structural damage is to add more structure or toughen the structure with different materials or constructions. This approach generally means adding a cost and weight penalty to a system and does not address the control and propagation of the damage resulting from a passing shock wave. Often the solutions found are point designs that cannot be applied to a broad cross-section of various structural designs. Other approaches, as illustrated above, include placing foam liners or inerting bladders into the fuel cells. In general, these approaches can be effective for fire suppression, but have very limited effectiveness against hydraulic ram pressure effects. Modern high performance systems cannot tolerate the loss of fuel capacity that these approaches require.

Although continuous foam liners may be partially effective in attenuating damage caused by hydraulic ram pressure, the use of a continuous foam layer over the entire inner surface of the tank exacts a sometimes unacceptable penalty in terms of reduced fuel tank capacity, especially in a fighter type aircraft having a relatively thin wing integral fuel tank. Additional penalties of increased dry weight and cost contribute to make it a less than optimum solution. A continuous layer of foam is not effective at selectively tailoring the shock wave response profile of the structure as does the present invention since the foam layer is of equal thickness on all surfaces, and again this solution exacts a major penalty in terms of reduced fuel volume that the tank is capable of containing.

Fuel tanks manufactured from composite materials may exhibit greater strength and at the same time greater vulnerability in different places, depending upon the fuel tank design details, than would a metallic tank. For such a composite fuel tank it may not be necessary to provide protection to areas which are less vulnerable than others. In fact, such protection should be concentrated in those areas where structural damage is most likely to lead to catastrophic failure and destruction of aircraft structural integrity. In a composite structure fuel tank, areas of catastrophic vulnerability typically exist where the external fuel tank wall is joined to internal spars and stiffeners. At this junction, separation can lead to loss of structural integrity of the surrounding aircraft structure, usually wing structure, resulting in loss of aircraft control.

SUMMARY OF THE INVENTION

The foregoing problems and limitations of prior art approaches and constructions have been overcome by the present invention which selectively places shock wave pressure response tailoring materials only at critical points inside a composite structure aircraft fuel tank while allowing inherent tank structural strength to withstand shock wave induced pressures where damage or failure is likely to be less than catastrophic. This approach thereby minimizes penalties of increased dry weight and cost, and of reduced fuel capacity. Accordingly, one object of the present invention is to provide structure which temporally decouples loading from shock wave pressure effects at critical structural locations. Another object of the present invention is to provide shock wave pressure effect protection while minimizing loss of available fuel volume inside a composite aircraft fuel tank. Yet another object of the present invention is to provide an acceptable level of protection from shock wave pressure effect while striving to minimize the aircraft dry weight and cost.

The present invention comprises placing voids that provide low shock impedance regions, at specific locations in the fuel tank to control the dynamic loading created in the structure. The voids uncouple or separate for a precise length of time and at a precise location, otherwise continuous loading in the structure, creating a loading profile that is controllable in time, location and magnitude. The sequence of loading applied to the structure can be tailored to take advantage of inherent strengths of the structure and to avoid particular failure modes. This enables gaining benefits of protection while not incurring unacceptable penalties.

The voids could be created by using either bladders or closed cell foams, but need to create a low shock impedance region. The word "shock" normally refers to a physical phenomenon related to the speed of sound in a compressible fluid. Most liquids, including jet engine fuel, are generally thought of as incompressible. Actually, such liquids are to a small degree, compressible, and the term "shock" is appropriate when discussing the intense pressure wave phenomenon resulting from detonation of a penetrating projectile in such liquid fluids.

As an illustration of the magnitude of the forces and velocities involved, the shock wave itself propagates through a medium (such as jet fuel) at a velocity of about 50,000 inches/second (or about 47.35 miles per minute). Where the free surface of a void is impacted by a shock wave, the free surface of the void closes or collapses at a rate of about 5,000 inches/second or about one tenth the speed of sound in the jet fuel. A closed cell foam void similarly will propagate the shock wave at about 5,000 inches/second. In general, this means there is a time delay of about 100 microseconds from the time the shock wave passes a particular point protected by a void, to the time the structure there is affected by the shock wave. The exact time delay will of course depend on the void thickness and speed of sound in the void material. Investigations of relative shock energy in a fuel tank subjected to penetration by a supersonic, exploding projectile have identified the explosion as the source of approximately 98% of the shock energy, and the kinetic energy of the penetrating projectile as contributing only about 2%.

"Shock impedance" is defined as the product of density of a medium multiplied times the speed of sound in that medium. In the present case, the medium is the fuel which is contained in the tank. As the shock wave propagates through the fuel and the void material, the void uncouples or shields a portion of the structure from the velocity induced by the shock wave, but only for a limited time. The void therefore produces a significant velocity gradient in the structure at the location of the void for a short length of time. This gradient can be used to create, that is, control, failure in specific regions. The velocity gradient integrated over time produces displacement and the resulting damage gradient.

The shape and response of a void determines the response and loading of the structure when affected by a shock wave. The instantaneous fluid pressure at the fuel-to-void interface determines the velocity of void closure and resulting void collapse response. By tailoring the shape of the void, the collapse can be made to occur in a predictable way and load the structure in a preferred sequence, thus providing a means of controlling the loading and resulting damage. Specific loading modes could be avoided or preferred ones induced, taking advantage of a specific strength of the structure (damage tolerance) or weakness of the structure (damage which relieves the structure). Deliberate stress concentrations can be utilized to induce failure at a precise point to thus relieve the spar cap region of force applied by the accelerated adjacent tank wall. Of course, application of such techniques will depend upon the details of the particular structural design under consideration.

A primary failure mode of multi-spar wing fuel cells in the shock wave pressure environment is "pull off" of the spar from the skin (or tank wall). Typical pull off reaction loads are in excess of three thousand pounds per inch. That is, for a joint of normal width, it would take an evenly distributed three thousand pounds of force pulling on the tank wall normal to the plane of the joint, for each inch of joint length, to cause the joint to part. Such pull off loading is a result of the shock wave accelerating the skin (or tank wall) normal to the fluid surface and tending to cause failure in the joint constraining the skin to the spar. In order to prevent this type of failure, a void region in the vicinity of the joint can momentarily decouple the shock wave normal acceleration from the skin locally.

This way, the mass and inertia of the protected region of the joint, which is continuously connected to the unprotected tank wall, momentarily retards the velocity of the adjacent, accelerated tank wall, mostly through shear forces, then, a short time later, after the adjacent tank wall has been decelerated by the protected tank wall, as the shock penetrates the void and begins acting on the tank wall and spar joint, the adjacent, decelerated tank wall similarly retards the induced velocity in the portion of the tank wall connected to the spar, thereby retarding the acceleration of the tank wall away from the spar. It is this displacement in time of forces acting on the joint that reduces the peak forces acting on the joint and that allows it to survive a shock wave that would destroy an unprotected joint.

The void should extend beyond the spar cap approximately 1/12 inch, and be greater than 1/4 inch deep. Designers can use finite element analysis techniques to optimize these parameters in order to use the minimum volume of void material and thus minimize the amount of fuel volume displaced in an actual structural design. It is particularly important in a fighter type aircraft to maximize fuel carrying capacity. By not applying a continuous layer of foam on the interior surface of the fuel tank, fuel capacity is retained. The present method reduces the load produced by pressure from a shock wave tending to pull the skin off the spar, by over 75 percent with voids placed in this manner.

The void region can be formed by using either an inert gas bladder or a low density closed cell foam. The shape of the foam void is not critical, but should meet the envelope requirements given above. If an inert gas bladder is used, then the shape of the void region is more important.

Void regions formed with inert gas bladders that have surfaces parallel to the tank wall will not produce significant load reductions. The regions should be tapered with a minimum wedge angle of 15° and should be tapered away from the spar cap (the void becomes thicker further from the spar). The bladder should be made with reinforcement fibers to improve its tensile load capability. Again, finite element analysis can be used to predict and optimize the void effects on the loading of the spar. A designer may thus tailor the shape of the fluid displacing member to produce a predetermined shock wave attenuation profile response.

Other objects, advantages and novel features of the invention will become apparent from the following detailed description of the invention when considered in conjunction with the accompanying drawing.

DESCRIPTION OF THE PREFERRED EMBODIMENTS

Figure 1:
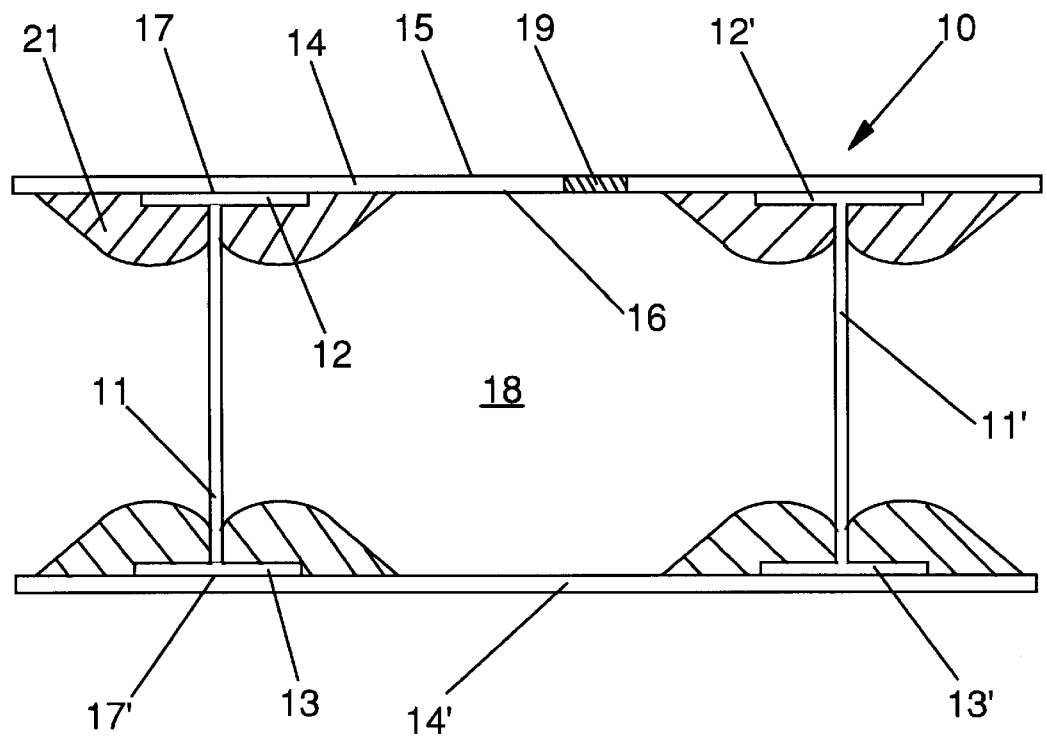
FIG. 1 is a sectional view of an aircraft fuel tank structure manufactured in accordance with the present invention.

Referring now to the drawing wherein like reference characters refer to like parts and elements throughout the several figures, there is shown in FIG. 1 a sectional view of a typical fuel tank construction 10 according to the present invention This construction primarily involves structural spars shown here in the form of an I-beam having a web 11 and flanges 12 and 13 (also termed "spar caps"). This structure is duplicated a plurality of times as illustrated by second web 11', and flanges 12' and 13'. The relative position of flanges 12 and 12' define a contour to which fuel tank wall 14 is secured to define the wall of fuel tank construction 10.

Fuel tank wall 14 defines an external surface 15 and an internal surface 16. Fuel tank wall 14 is joined with flange 12 at junction 17 to provide integral structural strength. Similarly, fuel tank wall 14 is joined to flange 12' at junction 17'. This construction is typical and also exists between fuel tank wall 14' and flanges 13 and 13'. The fuel tank construction details shown in FIG. 1 are considered representative of actual fuel tank construction details, but of course the actual design and dimensions for a fuel tank for an aircraft will depend upon the particular detailed design of that aircraft. This structure or construction will define a fluid containing body or tankage having an internal volume 18 for containing fuel.

In aircraft fuel tank construction 10 using composite materials, the critical point for catastrophic failure is junction 17 between flange 12 and fuel tank wall 14. If this junction and similar junctions come apart, the structural integrity of the entire fuel tank can be lost. In order to protect this critical junction 17 from the effects of dynamic loading caused by shock wave pressure effect, a fluid displacing closed cell foam 21 has been attached to fuel tank wall 14, flange 12, and web 11 as shown in FIG. 1 on each side, both top and bottom, of the internal structural spars or stiffeners utilized in the aircraft fuel tank. An appropriate adhesive compatible with foam 21, tank wall materials and fuel, should be chosen to retain foam 21 to tank inner surface 16, flange 12, and web 11, as is well known.

In an aircraft fuel tank at a moment after initial tank penetration a shock wave, caused by the detonation of a penetrating projectile, produces an acceleration, velocity and resulting displacement at an initial point on the tank wall as the shock wave passes that point. The shock wave induced displacement at that initial point on the tank wall also produces a far field moment in the tank wall at any point of interest distant from the initial point. As the shock wave moves through the medium toward the point of interest, the total far field moment seen by the structure at the particular point of interest increases.

It is the combined effect of adjacent tank wall velocity (sensed by the point of interest as a far field moment) coupled with the velocity induced in the tank wall at the point of interest as the shock wave passes that point, that results in structural damage. The present invention decouples direct pressure on tank wall 14 momentarily at the site of a void, so that the momentarily unaccelerated tank wall at the void serves to retard the accelerated tank wall adjacent to it and decelerate that adjacent tank wall so that several microseconds later when the shock reaches through the void and acts on the previously unaccelerated tank wall, the unprotected and now decelerated adjacent tank wall now serves to retard the acceleration of the void protected tank wall. This simple mechanism lowers the ultimate velocity induced in the protected tank wall and thereby reduces the vulnerability of the tank wall construction to failure. The effect of closed cell foam 21 then is to form a low shock impedance region to isolate structure locally from the near field effects of the incident shock wave for a brief moment and thereby decouple junction 17 from damaging effects of the combined adjacent tank wall velocity and displacement, and direct tank wall acceleration.

Fluid displacing closed cell foam 21 could be chosen to be any one of several materials, but should be a closed cell foam to avoid absorbing liquid fuel and consequently increasing the local speed of sound in the foam, thereby losing its ability to decouple displacement forces. The closed cell foam should be compatible with hydrocarbon fuels of the type typically used to power gas turbine engines. The foam density should be about an order of magnitude less than the fuel density, or approximately 2.5 lb/cu.ft. Polymethacrylimide foam has the appropriate properties necessary to endure the environment within a high performance integral fuel cell, and would be a good choice. One shape of foam void found to be particularly advantageous is illustrated in FIG. 1, although several other shapes of fluid displacing closed cell foam 21 could be used in any particular construction. In a particular design, finite element analysis techniques could advantageously be used to tailor the void size and shape to the exact requirements of the design, thereby avoiding waste of fuel containment capacity.

Figure 2:
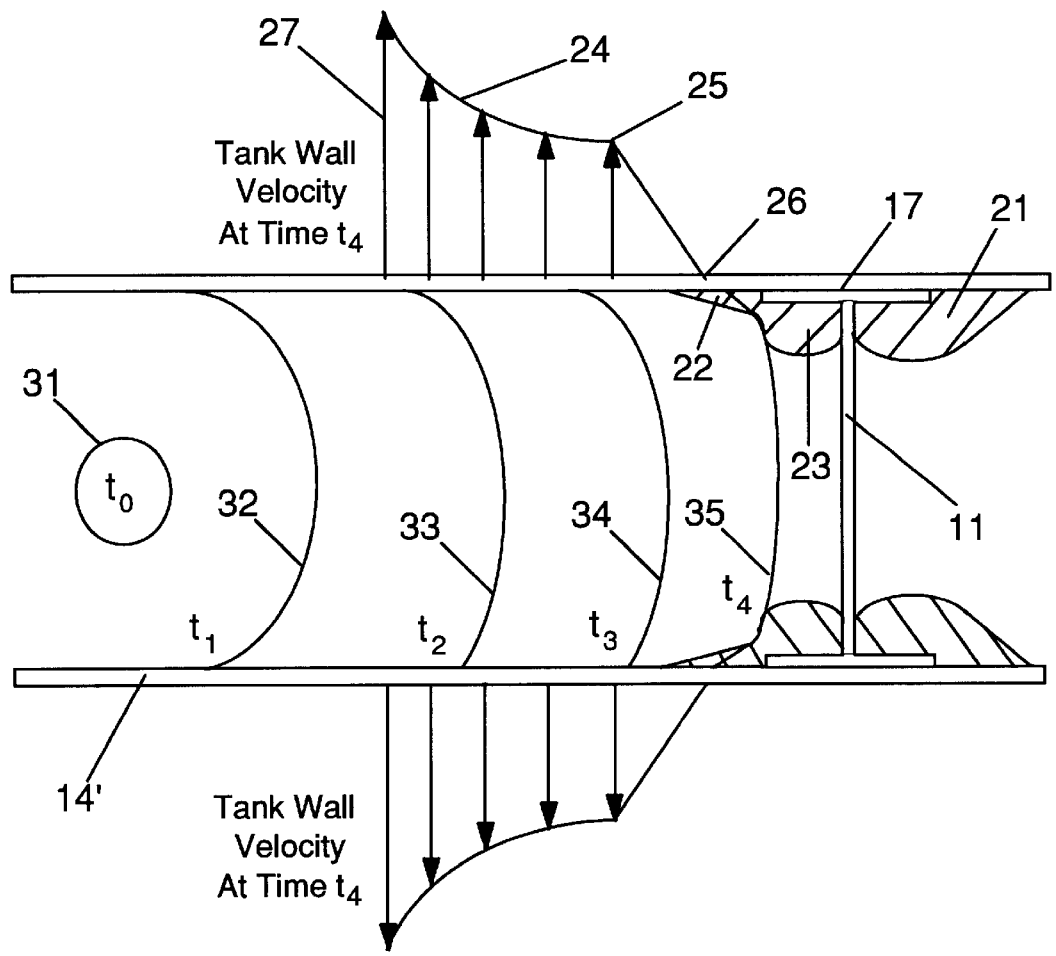
FIG. 2 is a sectional illustration of an aircraft fuel tank according to the present invention subjected to the shock wave pressure effects of a penetrating, exploding projectile.

Referring now to FIG. 2 there is shown an aircraft fuel tank construction similar to that illustrated in FIG. 1. Shock wave 31 is shown at a very short time interval after time $T_0$ when a projectile penetrates tank wall 14 at high velocity and detonates. The shock wave from this explosive event moves through internal volume 18 until at time $T_1$ it is shown as shock wave 32, and at time $T_2$ it is shown as shock wave 33. As the shock wave continues to move, the intense shock pressure imparts a velocity to tank wall 14 at each point on tank wall 14 it passes. The shock wave continues moving to the position shown by shock wave 34 at time $T_3$ and finally begins to interact with fluid displacing closed cell foam 21 as shown by shock wave 35 at time $T_4$ after initial detonation.

FIG. 2. is intended to illustrate the position of a single shock wave at different moments in time, a few microseconds apart, not a series of several shock waves. Compressed fluid displacing foam 22 has already been acted upon by shock wave 35 and has served to partially decouple fuel tank wall 14 from the direct effects of shock wave 35. Uncompressed portion of fluid displacing closed cell foam 23 is shown just prior to passage of shock wave 35.

Graphical curve 24 illustrates the approximate velocity at time $T_4$ of tank wall 14 at various points along external surface 15 resulting from passage of shock wave 35. Of particular note is the discontinuity in curve 24 beginning at point 25 corresponding to the edge of compressed fluid displacing closed cell foam 22 and point 26 corresponding to the instantaneous position along external surface 15 of shock wave 35. The curve between points 25 and 26 exhibits an attenuation of velocity caused by the edge of compressed fluid displacing closed cell foam 22 and its gradually thickening shape slowing transmission of shock wave 35 through the foam void moving in the direction of spar web 11.

At the precise location on tank wall 14 corresponding to point 26, forces tending to accelerate the tank wall under foam 21 are limited to shear and moment forces applied by adjacent material that has already been imparted a velocity. The direct forces from shock wave 35 are being delayed from reaching tank wall 14 by foam 21, the mass and inertia of tank wall 14 at the precise location corresponding to point 26 will serve to retard the induced velocity of adjacent tank wall material.

The low shock impedance region provided by fluid displacing closed cell foam 21, or equivalent materials, creates more than a simple energy absorption region that robs energy from the passing shock wave. In fact, little energy is dissipated in collapsing the foam void. Due to the lower speed of sound in the less dense low shock impedance region, information of the passing shock wave (fluid pressure) is not immediately communicated to the structure protected by a void (a low shock impedance region). The reduced speed of sound in the low shock impedance region creates a time delay in the initial excitation of the adjoining structure that is a function of the void thickness and the speed of sound in the void material. This time delay in the excitation of the tank wall in a local region surrounding the junction initially eliminates, or at least delays, a pull-off reaction (forces tending to pull the tank wall 14 away from I-beam flange 12) in the junction by reducing the take-off velocity (the velocity of the tank wall 14 relative to the velocity of the I-beam flange 12) of that local structure. Structure not covered (or isolated from a shock wave) by the void will have responded to the passing shock wave much earlier and achieved a velocity and resulting displacement.

A key concept to note is that at this point in time, the tank structure is being accelerated at discrete locations but is not being accelerated in the structure shielded by the void. The acceleration of the structure thus occurs in sequences or phases such that the passing shock wave does not act in concert with the entire tank wall structure simultaneously. This phasing creates velocity gradients in the tank structure that reduce the junction pull-off loads (loads tending to separate tank wall 14 from I-beam flange 12) by promoting a less coherent structural response. The phasing also creates higher, more complex mode shapes in the reacting structure and promotes failure in designed mode and location.

The total shock wave induced load that tank wall 14 imposes on junction 17 can be thought of as the sum of 1) shear forces from adjacent tank wall material acted upon by far field displacement and the tank wall shock induced velocity gradient, and 2) direct pressure on junction 17 from the passing shock wave.

Placing a void against junction 17 will uncouple the direct pressure loading of junction 17 by delaying, and therefore initially eliminating, the near field tank wall normal pressure component. Although the near field loading will eventually act on junction 17, it will act at a time after junction 17 has already retarded velocity in the unprotected adjacent tank wall material affected by the shock wave. Thus, the direct pressure and shear forces in the adjacent tank wall material do not act at the same time. This phenomenon is similar to constructive interference in wave physics. Because of the effect of void 21, these shear and direct pressure forces are now out of phase with one another, similar to destructive interference in wave physics, to reduce the total loading sensed by junction 17. The maximum forces tending to separate junction 17 at any one time are much less than they would be if all of the loading components acted simultaneously, although none of the component forces themselves are reduced significantly. The phasing or timing of the near field loading can be controlled by selecting an appropriate thickness of fluid displacing closed cell foam material or its equivalent, since the speed of sound in that material will be essentially constant, and such tailoring of shape and thickness to achieve correct near field load phasing or timing will depend exclusively on effective material thickness.

The velocity gradient in tank wall 14 created by the low shock impedance region could be used to deliberately break the tank wall structure at a desired location in order to relieve the far field moment loading on junction 17 from the far field tank wall displacement. By uncoupling the far field displacement moment, the resulting junction load will be significantly reduced throughout the sequence of events, although the fluid containment capability of the fuel tank will be compromised. Designers seeking to enable the aircraft fuel tank to survive, may choose to sacrifice the tank wall which will already have been penetrated anyway, rather than attempt to maintain fuel containment integrity at the expense of structural integrity. The design choice recognizes that it is better to lose some fuel, than to lose the entire aircraft.

To fully appreciate the present invention, it is important to understand that changing the phase of near field direct pressure loading relative to adjacent tank wall material shear force loading, at discrete locations on the tank wall, cannot occur in fuel tanks having a continuous, constant thickness foam layer. This is because the function of the foam layer is merely to provide a medium having a lower local speed of sound. When designers place a constant thickness layer of foam between the fuel and the tank wall, the shock wave traveling through the fuel contacts the foam, propagates through the foam at a lower velocity than it had been traveling through the fuel, then acts on the wall a few microseconds later than it would have had there been no foam layer. Adjacent tank wall material has already been accelerated as the direct pressure acts on junction 17, the same as in an unprotected fuel tank. All loadings are in phase, and no shock wave protection benefits are achieved by utilizing a thin, continuous foam layer.

In general, phasing the shock wave loading by selective placement of low shock impedance region voids will cause the protected structure to respond to the incident shock wave in higher, more complex mode shapes, accompanied by lower structural displacements, assuming a fixed amount of available strain energy. An analogy to destructive interference in wave physics can be used to explain the resultant loading conditions of the joint created by selective placement of the voids. The acceleration of tank wall 14 will not be a simple function of the passing shock wave pressure, but will be broken up into increments that are not acting coincidentally. Tank wall structure protected by the voids from direct pressure will momentarily retard the motion of adjacent but unprotected material, thereby reducing displacements which could otherwise result in application of moment forces leading to damage or loading of the junction, and also creates a higher mode response.

Placing a continuous void on the tank wall as practiced heretofore by others, does not create the load uncoupling effect that was described above. With a continuous foam layer, the far field loading and near field loading of the junction are not separated in time, only delayed. The void formed by the continuous foam layer closes against the structure at a time that is merely delayed by the thickness of the void divided by the speed of sound in that foam material. Since the near and far field tank wall displacements are not separated temporally, no ultimate load reduction by the junction is realized. In addition, velocity gradients cannot be modified by applying a continuous foam or void layer. The loading and response of such a structure is coherent and results in a primary mode shape leading to larger tank wall displacement.

Energy absorption performed by the continuous foam layer or void region requires a significantly different loading condition than the passing shock wave provides. The pulse width of the shock wave created by an explosive projectile within the fuel medium is on the order of 50 microseconds. It is physically impossible for a foam or bladder to crush or close rapidly enough to be effective at absorbing energy during a loading impulse of this short time duration. Therefore, the function of the low shock impedance region in the present invention is not primarily to absorb shock energy, but to isolate an area of fuel tank structure from this high impulse shock wave load for a precise length of time to thereby allow the protected tank wall to limit the resulting velocity of the adjoining structure so that when the shock does act on the protected structure, the adjoining structure will retard its acceleration. Energy absorption by foam crushing requires a hydrostatic, much longer duration loading condition to be present which is not present in a shock wave induced by the impacting, detonating projectile.

Figure 3:
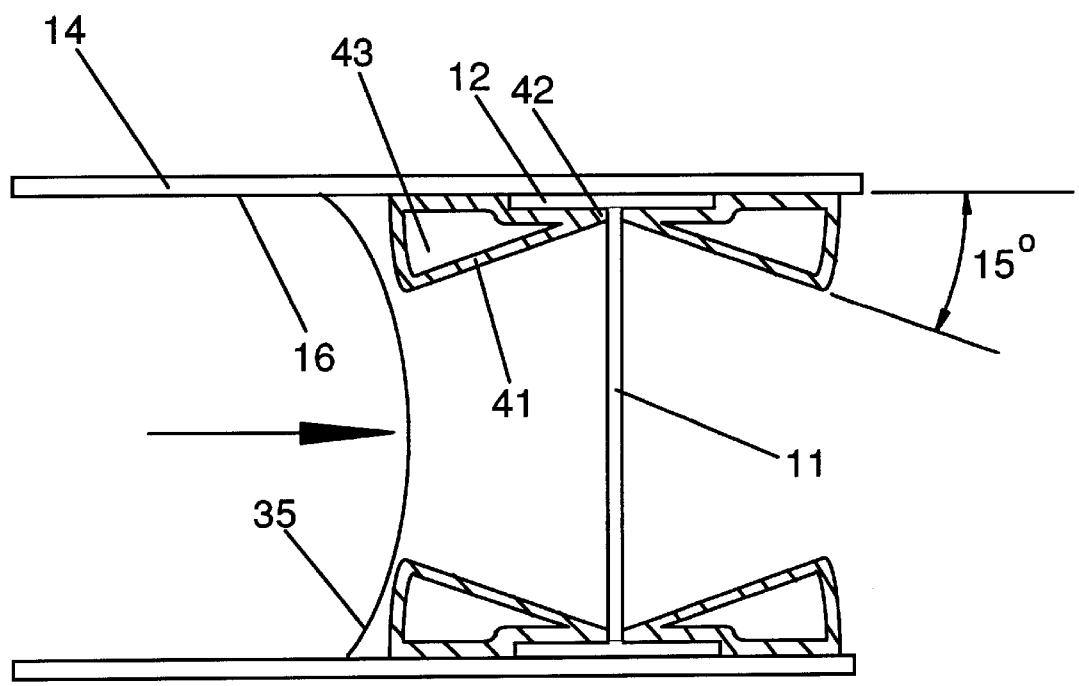
FIG. 3 illustrates in section an alternate embodiment of the present invention.

An alternative construction to fluid displacing closed cell foam 21 is shown in FIG. 3. Inflated isolator 41, having a wedge shape is attached to internal surface 16 of fuel tank wall 14. Isolator 41 is made from an elastomeric material having fiber reinforcement such as nylon fibers for increased tensile strength, as is known. Apex 42 of wedge shaped isolator 41 is positioned against web 11 and flange 12. Isolator 41 is filled with a mostly inert gas such as Nitrogen, which is compressible. Of course, other gases could be used, so long as the gas used is sufficiently inert so as not to contribute to fire or explosion hazard when the fuel tank is filled with fuel. As illustrated in FIG. 3, an inflated isolator 41 is placed continuously on each side of web 11 and at each end of web 11 where its placement will beneficially serve to momentarily decouple shock wave pressure effects. Isolator 41 should be formed to describe approximately a 15° or greater angle as shown in FIG. 3. Angles less than 15° have been shown to be less effective in dealing with the effects of a shock wave.

By designing the void to have a 15° angle, oriented as in FIG. 3, the passing shock wave first acts on the thickest portion of the wedge, then moves along the wedge as the wedge thickness decreases. This greater thickness and hence greater delay of the shock at the thick end of the void, coupled with a decreasing thickness across the void, allows the shock wave propagating in the void to reach the inner surface 15 of tank wall 14 at about the same time all across the area protected by the void. This design further spares junction 17 from some of the shear and moment effects experienced by an unprotected region.

Figure 4:
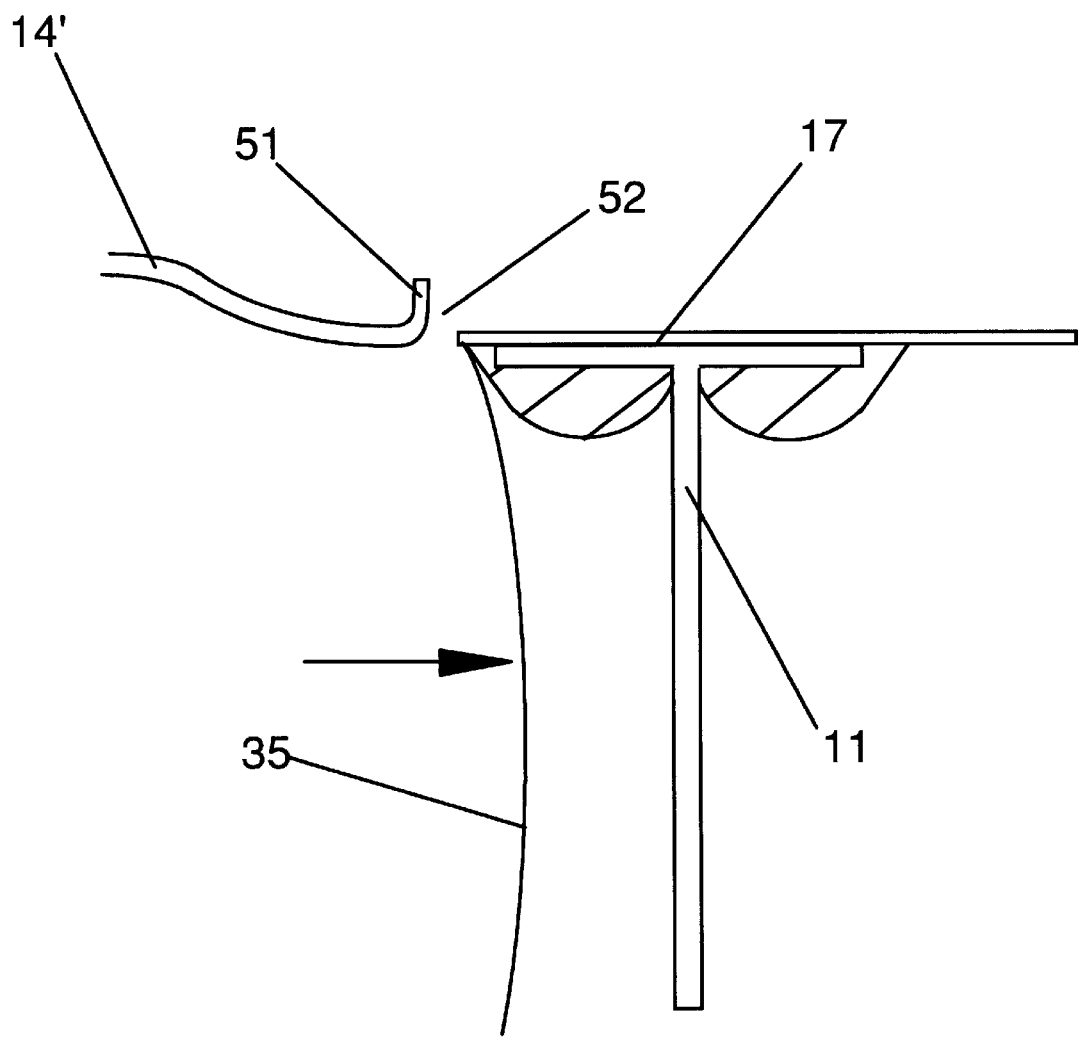
FIG. 4 illustrates a load relief feature in accordance with the present invention.

Fuel tank wall 14 may further incorporate a selected zone of preferred failure 19 having a pre-selected structural feature which, in response to a sufficiently strong shock wave, will initiate fuel tank wall failure at a precise location. Failure in a selected zone prevents further transmission of adjacent tank wall shear forces and far field moment to junction 17. Such deliberate failure is intended to ensure that structural integrity of the fuel tank structure is not lost, although fuel will undoubtedly be lost through the breach caused by the failure. FIG. 4 illustrates a preferred failure feature that could be designed into the aircraft fuel tank construction of the present invention. As illustrated in FIG. 4, zone of preferred failure 19 has opened up under the influence of shock wave pressure effects on the unprotected material and has sheared the tank wall between there and the protected tank wall. The failure has formed lip 51 and opening 52. As the shock wave acts on junction 17, there will be little or no decelerated adjacent tank wall material to resist the direct pressure on junction 17, as there was before zone of preferred failure 19 opened.

Of course there are several different ways to design a zone of preferred failure 19. The zone could be formed by intentionally building a weaker section in fuel tank wall 14. How best to produce zone of preferred failure 19 depends on the material used to construct fuel tank wall 14 and the details of the actual design used for fuel tank wall 14. For example, if fuel tank wall 14 is manufactured from a composite material, then either discontinuities could be introduced in the fibers forming that composite material, different resins could be used to produce lower levels of structural strength in precise locations, wall thicknesses could be thinner, and features could be designed in to produce stress concentrations that will initiate failure at preferred locations. The important feature of zone of preferred failure 19 is that in response to a passing shock wave inside aircraft fuel tank construction 10, a predetermined zone can be designed to fail and provide relief from far field loading so that more important aircraft structure is spared some of the destructive effects accompanying passage of a shock wave.

Figure 5:
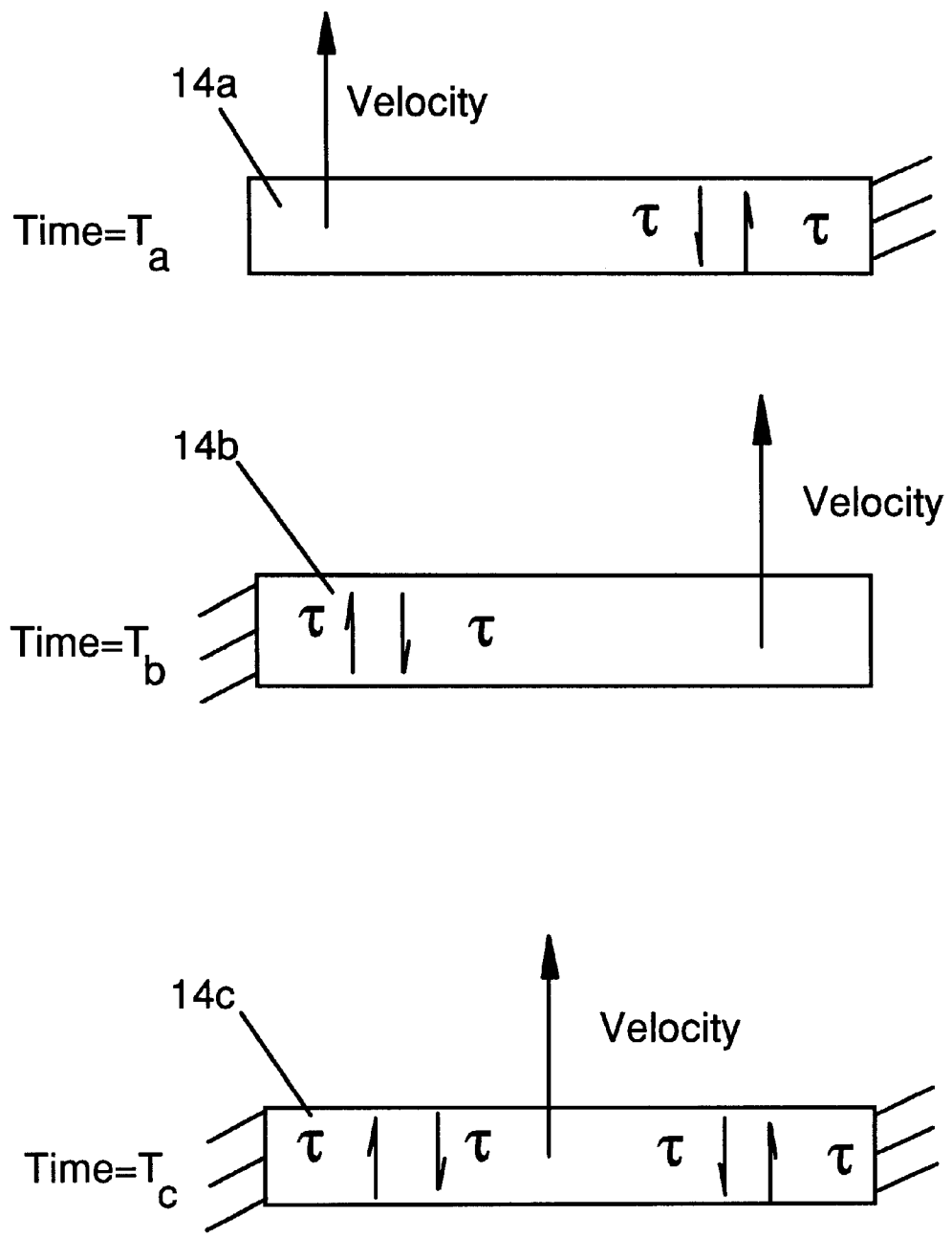
FIG. 5 illustrates the shear reactions existing in the tank wall at three different locations and at three different times.
Figure 6:
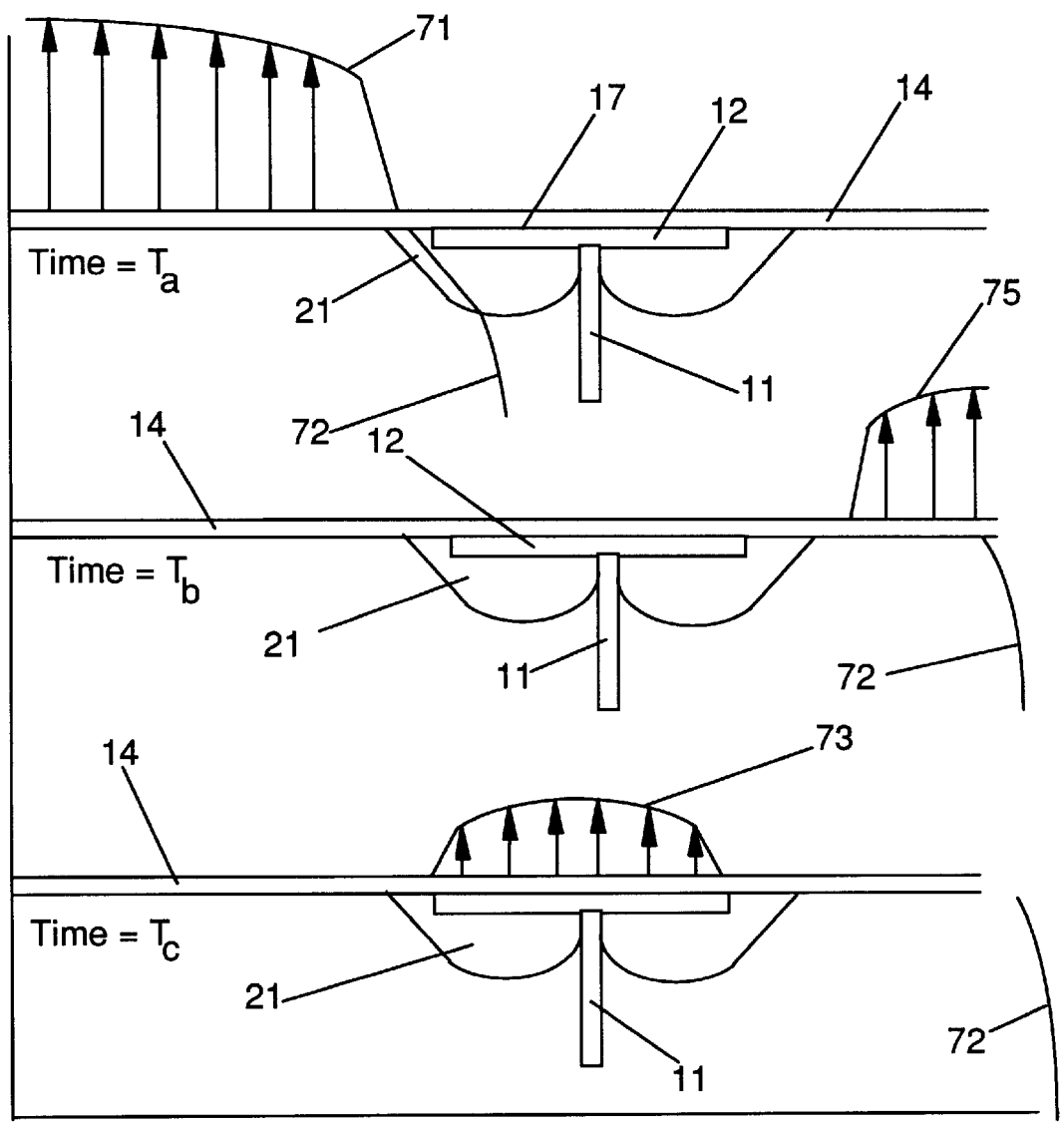
FIG. 6 illustrates the induced velocity profile in three sections of tank wall at three different times.

A graphic explanation of the present invention is found in FIGS. 5 and 6. In FIG. 5, three representative sections of tank wall 14 are shown in each of three different loading modes. In FIG. 5, the tank wall section 14a corresponds to the tank wall to the immediate left of void 21 as shown with velocity profile 71 at time $T_a$ in FIG. 6. In FIG. 5, the tank wall section 14b corresponds to the tank wall to the immediate right of void 21 as shown as shown with velocity profile 75 at time $T_b$ in FIG. 6. In FIG. 5, the tank wall section corresponds to the tank wall at junction 17 that is protected by void 21 as shown with velocity profile 73 at time $T_c$ in FIG. 6. Shear reactions are shown in FIG. 5 by a vertical couplet of arrows, one pointed up and one pointed down, accompanied by the symbol τ (tau). The direction of the moment resisted by the shear force is indicated by which arrow of the couplet is pointed up and which is pointed down, in conformance with generally accepted stress representation conventions.

Referring now to FIGS. 5 and 6, at time $T_a$ shock wave 72 has given the left side of tank wall 14a an upward velocity, but tank wall 14a is also anchored on its right side by the mass and inertia of the section of tank wall to its immediate right. This results in a shear reaction in tank wall 14a which tends to retard or snub the upward velocity. The right side of tank wall 14a is anchored because void 21 is momentarily preventing shock wave 72 from acting on tank wall to the immediate right of tank wall 14a.

In FIGS. 5 and 6, several microseconds later at time $T_b$, tank wall 14c, the portion of tank wall over junction 17, has no upward velocity. Shock wave 72 has left the area of tank wall 14c protected by the void and has again begun directly acting on tank wall 14b, giving it an upward velocity. As shown in FIG. 5, tank wall 14b has an upward velocity on its right side, but is anchored on its left side by the mass and inertia of tank wall 14c which has no velocity. This loading results in a shear reaction in tank wall 14b tending to snub the upward velocity of tank wall 14b.

In FIGS. 5 and 6, again several microseconds later, tank walls 14a and 14b have now been snubbed by tank wall 14c to have little upward velocity, while shock 72 has now penetrated void 21 and acted on tank wall 14c, giving it an upward velocity. At time $T_c$, tank wall 14a and tank wall 14b are both now anchoring tank wall 14c at both right and left sides, resulting in two shear reactions which tend to snub velocity in tank wall 14c.

This decoupling or phase change of the effects of the shock wave only occurs at locations where the speed of sound changes abruptly, that is, where designers have placed a void 21. This effect does not occur if the inner surface is continuously lined with a foam layer because then there is no abrupt change of the speed of sound adjacent to the tank wall. This method is particularly appropriate for use in composite structure where the continuous tank wall is better able to withstand pressure loadings from a passing shock wave than is a joint where the tank wall is attached to a stiffener or spar. Similarly, the construction of the present invention would serve equally well in protecting the structural integrity of other composite tanks for containing other liquids than fuels, such as water tanks, oil tanks, or the like that may be subjected to penetration by high speed, exploding projectiles.

Obviously, many modifications and variations of the present invention are possible in the light of the above teachings. It is therefore to be understood that within the scope of the appended claims the invention may be practiced otherwise than as specifically described.

What is claimed is:

1. A tank construction capable of containing a liquid fluid, and having enhanced ability to survive a shock wave caused by detonation of a penetrating projectile, comprising:

a plurality of structural spars arranged to define a common tank wall contour;

a fluid impervious tank wall rigidly joined to each of said plurality of spars at a junction along each spar, said common tank wall contour defining an exterior tank wall surface and an interior tank wall surface for providing both liquid fluid containment adjacent said interior tank wall surface, and integral structural strength, said interior tank wall surface between adjacent spars being in direct pressure contact with the contained fluid; and a fluid displacing member having a predetermined density that is less than the density of a liquid fluid to be contained by said tank construction defining a low shock impedance region, said fluid displacing member being attached only to a preselected portion of the interior tank wall surface and one of said plurality of structural spars in the vicinity of the junction between said spar and said tank wall, and positioned to provide separation of said contained fluid from said spar and said interior tank wall surface at said junction, to selectively shield and momentarily decouple said junction from direct pressure caused by said shock wave.

2. A tank construction as set forth in claim 1, wherein each of said plurality of spars further comprises a beam having a web, and a flange defining said common tank wall contour.

3. A tank construction as set forth in claim 1, wherein said fluid displacing member comprises a closed cell foam material.

4. A tank construction as set forth in claim 3, wherein said fluid displacing members each have an average density in the range of from one eighth to one twelfth the density of the fluid to be contained by said tank wall.

5. A tank construction as set forth in claim 1, wherein said fluid displacing member comprises polymethacrylimide foam.

6. A tank construction as set forth in claim 1, wherein said fluid displacing member comprises an inert gas filled elastomeric bladder having a long dimension aligned parallel with one of said spars.

7. A tank construction as set forth in claim 6, wherein each of said fluid displacing members has a lateral section generally describing a wedge shape, having one side positioned against said interior tank wall, and the wedge apex being positioned adjacent the spar web and flange, said wedge shape subtending an arc of at least fifteen degrees.

8. A tank construction as set forth in claim 6, wherein said fluid displacing member has an exterior shape tapered from a thin portion adjacent said spar to a thick portion spaced from said spar.

9. A tank construction as set forth in claim 1, wherein said tank wall has a preselected region of preferred failure at a location spaced from said junction to provide deliberate tank wall failure at said preselected region in response to coincidental near and far field loading greater than a predetermined minimum magnitude, resulting from passage of a shock wave.

10. A method for controlling tank wall velocity in a tank subjected to a shock wave from a detonating penetrating projectile, comprising the steps of:

identifying the location of a vulnerability region in a tank structure where combined near and far field loading from a passing shock wave may cause catastrophic structural failure;

shaping fluid displacing material to form a low shock impedance region; and attaching said low shock impedance region to said tank structure only at said identified vulnerability region.

11. A passive method for controlling dynamic structural damage in a shock wave pressure environment, comprising:

identifying an area in a fluid containing structure where internal shock wave induced structural damage may produce catastrophic structural failure;

dimensioning a controlled density fluid displacing member to a predetermined shape corresponding only to said area; and attaching said fluid displacing member only to, and coextensively with, said area.

12. A passive method for controlling dynamic structural damage in a shock wave pressure environment, as set forth in claim 11, further comprising:

tailoring said fluid displacing member shape to produce a predetermined shock wave attenuation profile in response to a passing shock wave.

* * * * *